(12) United States Patent
DiPenti et al.

(10) Patent No.: US 7,244,058 B2
(45) Date of Patent: Jul. 17, 2007

(54) INTERIOR LAMP

(75) Inventors: Timothy A. DiPenti, Russel, PA (US); Philip C. Roller, Ashville, NY (US)

(73) Assignee: Truck-Lite Co., Inc., Falconer, NY (US)

( * ) Notice: Subject to any disclaimer, the term of this patent is extended or adjusted under 35 U.S.C. 154(b) by 0 days.

(21) Appl. No.: 11/077,918

(22) Filed: Mar. 10, 2005

(65) Prior Publication Data

US 2005/0201098 A1 Sep. 15, 2005

Related U.S. Application Data

(60) Provisional application No. 60/552,133, filed on Mar. 10, 2004.

(51) Int. Cl.
*F21V 29/00* (2006.01)

(52) U.S. Cl. .............. 362/547; 362/490; 362/373

(58) Field of Classification Search ........... 362/490, 362/546, 547, 294, 373
See application file for complete search history.

(56) References Cited

U.S. PATENT DOCUMENTS

| | | | |
|---|---|---|---|
| 4,509,104 A | 4/1985 | Suzuki et al. | 362/32 |
| 4,967,330 A | 10/1990 | Bell et al. | 362/311 |
| 5,607,227 A | 3/1997 | Yasumoto et al. | 362/249 |
| 5,632,551 A | 5/1997 | Roney et al. | 362/249 |
| 5,655,830 A | 8/1997 | Ruskouski | 362/240 |
| 5,806,957 A | 9/1998 | Prior et al. | 362/61 |
| 5,833,355 A | 11/1998 | You et al. | 362/244 |
| 6,045,240 A * | 4/2000 | Hochstein | 362/294 |
| 6,157,117 A | 12/2000 | Taylor | 313/318.01 |
| 6,158,882 A | 12/2000 | Bischoff, Jr. | 362/488 |
| 6,203,180 B1 | 3/2001 | Fleischmann | 362/471 |
| 6,354,714 B1 | 3/2002 | Rhodes | 362/153.1 |
| 6,361,186 B1 | 3/2002 | Slayden | 362/249 |
| 6,361,190 B1 | 3/2002 | McDermott | 362/310 |
| 6,411,022 B1 | 6/2002 | Machida | 313/318.1 |
| 6,517,218 B2 * | 2/2003 | Hochstein | 362/294 |
| 6,592,238 B2 | 7/2003 | Cleaver et al. | 362/249 |
| 6,609,804 B2 | 8/2003 | Nolan et al. | 362/20 |
| 6,641,284 B2 * | 11/2003 | Stopa et al. | 362/240 |
| 2003/0048641 A1 | 3/2003 | Alexanderson et al. | 362/470 |
| 2003/0102810 A1 | 6/2003 | Cross et al. | 315/74 |
| 2003/0179585 A1 | 9/2003 | Lefebvre | 362/544 |
| 2006/0146531 A1 * | 7/2006 | Reo et al. | 362/244 |

FOREIGN PATENT DOCUMENTS

| | | |
|---|---|---|
| DE | 20 2004 000 587 | 4/2004 |
| EP | 1 182 396 | 2/2002 |
| WO | WO 02/05356 | 1/2002 |
| WO | WO 03/102467 | 12/2003 |

* cited by examiner

*Primary Examiner*—Laura Tso
(74) *Attorney, Agent, or Firm*—The Bilicki Law Firm, P.C.

(57) ABSTRACT

A vehicle lamp assembly comprised of: a heat sink with at least one flange extending beyond the lamp assembly; a circuit board functionally engaging the inner surface of the heat sink and having a power supply circuitry; at least one light emitting unit electrically connected to the heat sink; a potting compound substantially imbedding the circuit board and corresponding electrical connections; and a lens operatively attached to the heat sink. In one embodiment, the light emitting unit is an LED. In alternate embodiments, the lamp assembly can include fins and/or fans to further facilitate cooling of the assembly, and/or a reflective inner surface of the heat sink to increase the lamp assembly's luminous output.

70 Claims, 9 Drawing Sheets

INTERIOR LAMP

CROSS-REFERENCE TO RELATED APPLICATIONS

This application claims the benefit of and priority to U.S. provisional application No. 60/552,133 filed Mar. 10, 2004, incorporated herein in its entirety.

FIELD OF INVENTION

The subject invention relates generally to a lamp assembly. More specifically, the invention relates to an LED interior lamp assembly used to illuminate an area in a low temperature or insulated environment.

DETAILED DESCRIPTION OF EMBODIMENTS OF THE INVENTION

For the purpose of promoting an understanding of the present invention, references are made in the text hereof to embodiments of a lamp, only some of which are depicted in the drawings. It is nevertheless understood that no limitations to the scope of the invention are thereby intended. One of ordinary skill in the art will readily appreciate that modifications such as those involving the type or number of light emitting units, the geometry of the lamp, the shape of the lens, the type and placement of optical elements of the lens, the positioning of the lamp within a vehicle, use of the lamp outside of a vehicle, and alternate uses of the lamp do not depart from spirit and scope of the present invention. Moreover, it is contemplated that the device be used to retro-fit fluorescent fittings or be part of a vehicle's original equipment. Some of these possible modifications are mentioned in the following description. Furthermore, in the embodiments depicted, like reference numerals refer to identical structural elements in the various drawings.

The invention is a lamp assembly that employees one or more light emitting units to illuminate an area. The lamp assembly is particularly useful in low-temperature environments such as refrigeration units and northern climates or in any structure using insulating material in which the heat generated by the lamp is not immediately and directly dissipated.

Figure 1:
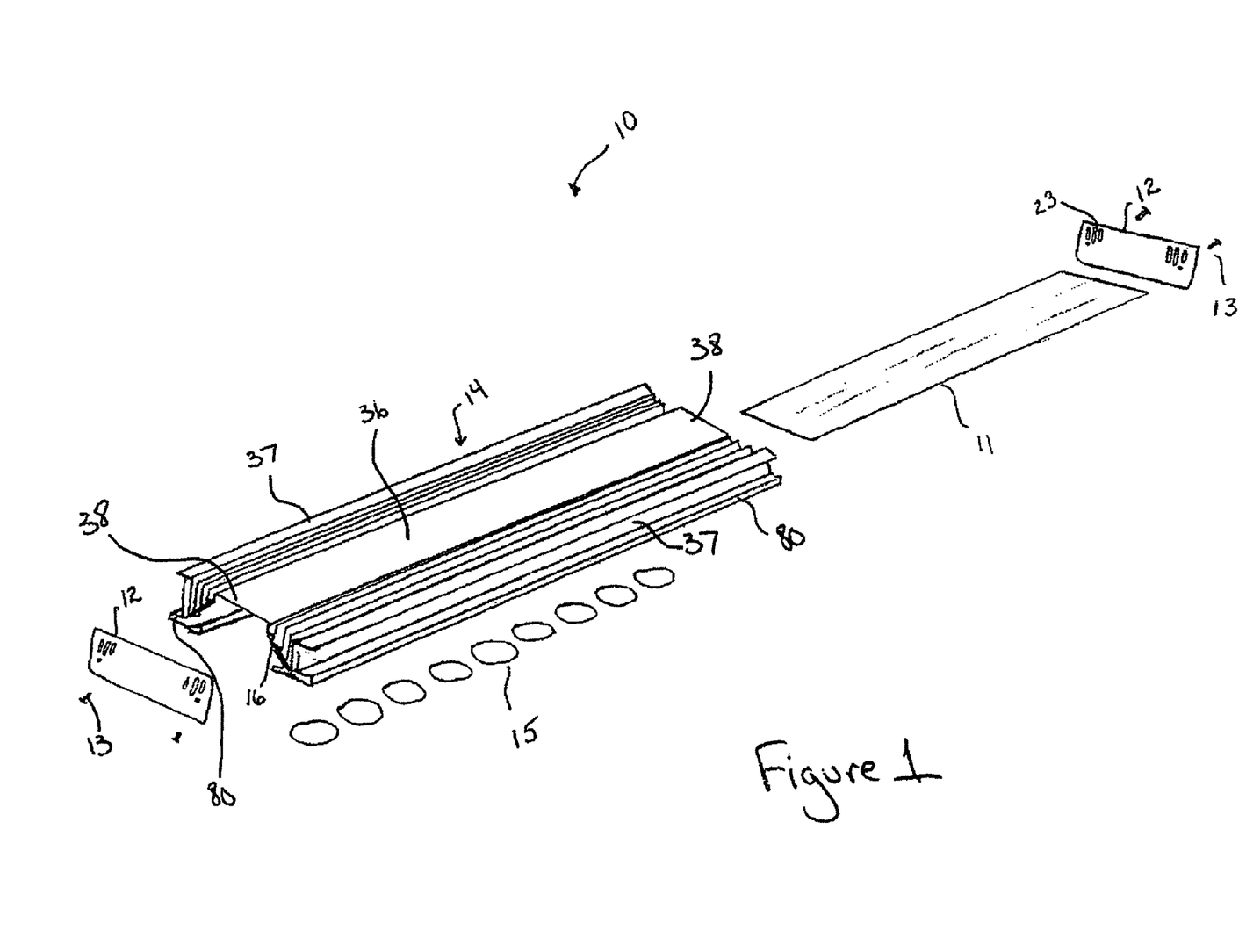
FIG. 1 is an exploded view of one embodiment of the lamp.

FIG. 1 is an exploded view of one embodiment of lamp 10 and shows the main elements of one embodiment of lamp 10. It can be appreciated that lamp 10 is comprised of lens 11, heat sink 14 having an inner surface and a back surface, and light emitting units 15. In this embodiment, light emitting units 15 are light emitting diodes, LEDs. The back surface of heat sink 14 has center region 36, side regions 37, and edge regions 38, including contiguous fins 16 forming side regions 38. Side regions 37 help anchor lamp 10 and provide an additional means for heat dissipation.

In this embodiment, fins 16 are contiguous with the remaining elements of heat sink 14, but could also be made of compounds separate from each surface of heat sink 14. Fins 16 are included in this embodiment to increase the surface area of heat sink 14 to facilitate heat dissipation via convection. Heat sink 14 is, in one embodiment, made of aluminum, but can be made of any material capable of absorbing the heat generated by lamp 10 and dissipating it to the environment without an appreciable phase change or change in temperature. Heat sink 14 could also be constructed from a formed sheet-metal part or die cast.

Lamp 10, in one embodiment, includes as its light source white light emitting LEDs. In one embodiment, the LEDs have a range of luminous flux of approximately 10 to 140 lumens, but can also be as much at 500–1000 lumens. End caps 12, in the depicted embodiment, are coupled to edge regions 38 of lamp 10 by drive screws 13, but end caps 12 can also be fixedly secured to heat sink 14 by any means, including but not limited to extrusion screws, pop rivets, and any other mechanism known to those of ordinary skill in the art. In the embodiment of end cap 12 shown in FIG. 1, end cap 12 further includes slots 23 which allow air flow through lamp 10 to further facilitate cooling of lamp 10. In an alternate embodiment, lens 11 is molded to fit over heat sink 14, eliminating the need for end caps 12. It is also possible to eliminate end caps 12 with a die cast or formed metal part at the end of heat sink 14.

Figure 2:
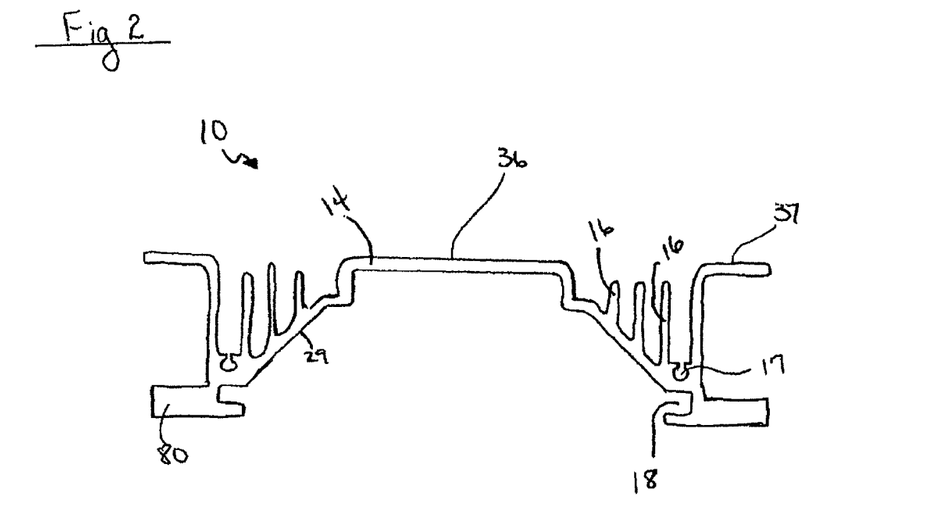
FIG. 2 is a cross-sectional view of the heat sink used in one embodiment of the lamp.
Figure 7A:
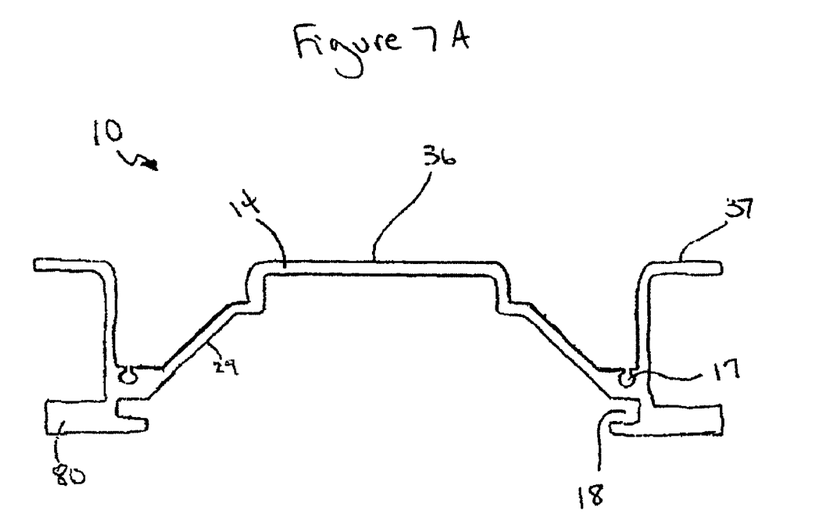
FIGS. 7A and 7B show cross-sectional views of alternate embodiments of the lamp housing in which the housing does not include fins or the side regions, respectively.

FIG. 2 is a cross-sectional view of one embodiment of heat sink 14 which further acts as the base to which the other components are attached. In the present embodiment, the back surface of heat sink 14 has three contiguous fins 16 on each side forming the side regions. The number of fins 16 can vary as long as the heat dissipation characteristics are not compromised, including an embodiment without any fins (as shown in FIG. 7A). It can further be appreciated that screw boss 17 is included to for receive the screws (not shown) that hold the end caps (not shown) to heat sink 14. FIG. 2 also shows tracks 18 present in heat sink 14. Tracks 18 allow for the sliding of the lens (not shown) and securing it to heat sink 14. It should be understood that other means such as an adhesive or screws could be used to keep the lens in place, either instead of or in addition to tracks 18. Edge regions 38 and center region 36 (see FIG. 1) of heat sink 14 can be used to couple lamp 10 to a vehicle (not shown in this figure) by screws. In one embodiment of heat sink 14, heat sink 14 is further comprised of interior reflective surface 29, which is painted white to enhance reflection of the light through the lens (also not shown). Reflective surface 29 can run the length of heat sink 14 or there can be a segmented reflected surface 29 such that each segment of reflected surface 29 corresponds to each light emitting unit (also not shown in this figure). In one embodiment of heat sink 14, interior reflective surface 29 is a series of 6 mm focus parabolic reflectors, discussed in greater detail infra.

Also visible in FIG. 2 are flanges 80, which act as a heat exchanger. When lamp 10 is positioned within a vehicle or other structure, the insulation can prevent heat generated by light emitting units 15 from being dissipated. As light emitting units 15 can produce substantial amounts of heat, without a way to dissipate the heat generated by light emitting units 15, the life of light emitting units 15 can be greatly reduced. Flanges 80 of heat sink 14 act as a heat exchanger with the environment and allow the heat generated by lamp 10 to be dissipated.

Figure 3:
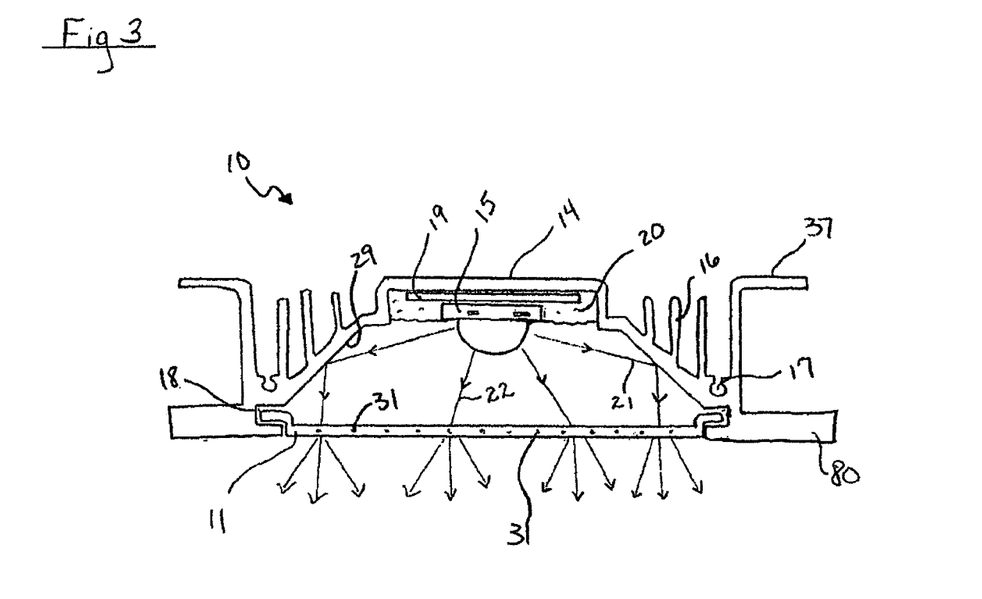
FIG. 3 is a cross-sectional view of one embodiment of the lamp.

FIG. 3 is a cross-sectional view of one embodiment of lamp 10 and relationship among the elements of the invention, including lens 11. Once more it can be appreciated that fins 16 of heat sink 14 provide extra surface area for heat exchange with the environment. Circuit board 19 is provided with power supply circuitry. The power supply circuitry used to drive lamp 10 can be a linear regulator or a switching power supply for DC to DC conversion. Circuit board 19 can be located anywhere in lamp 10. Light emitting units 15 are bonded to heat sink 14 by any appropriate method well-known to those of ordinary skill in the art such as screws, rivets, or adhesives. In one embodiment, light emitting units 15 are Luxeon™ 3-Watt LEDs. The Luxeon™ Star light emitters are mounted on their own carrier, which is an aluminum circuit board. The Luxeon™ 3W LEDs are then bonded directly to heat sink 14. No LEDs are to be mounted to circuit board 19 carrying the power supply circuitry. Circuit board 19 and LEDs are potted with an appropriated potting compound 20 such as epoxy. The potting of the electrical components protects them from condensation, moisture, and vibrational damage.

It can also be appreciated in FIG. 3 that light emitted from light emitting unit 15 is reflected from reflective surface 29 (see beam 21) of heat sink 14 toward lens 11 which defocuses the emitted light. In the embodiment of FIG. 3, optics 31 are present in lens 11 for redirecting and dispersing light. Light emitted directly to the lens 11 (see beam 22) is treated in a like manner. The light is distributed in a relatively uniform manner simulating the light from a fluorescent lamp. Light emitting units 15 are bonded directly to heat sink 14, creating close contact to keep their operating temperatures within acceptable limits. Potting compound 20 also enhances the cooling effects on light emitting units 15. Light emitting units 15 can be arranged in a single row or in a plurality of rows or in other patterns such as a circle. It should be also understood that the number of LEDs 15 can vary from a single light emitting units to a plurality. The number of light emitting units 15 depends on the desired amount of light and luminous flux of each light emitting unit 15 produced.

The customer generally establishes the level of illumination require since no legal requirements exit for interior lighting. The Technology and Maintenance Council (TMC) part of the American Trucking Association (ATA) has some recommended practice that establishes minimum guidelines for photometric performance of interior lighting system. The Illuminating Engineering Society of North America (IES) also has recommended lighting levels for various tasks. The recommendations vary depending on the person's age and the task to be performed. For example, for general reading, 200 Lux is recommended, for walking and moving about approximately 100 Lux is recommended, and for just looking for an object on the floor of a vehicle 50 Lux is recommended; Lux being a unit of luminous incidence or luminance equal to one lumen per square meter. The lamp of the present invention can be constructed to meet or exceed any of the recommended guidelines.

Figure 4:
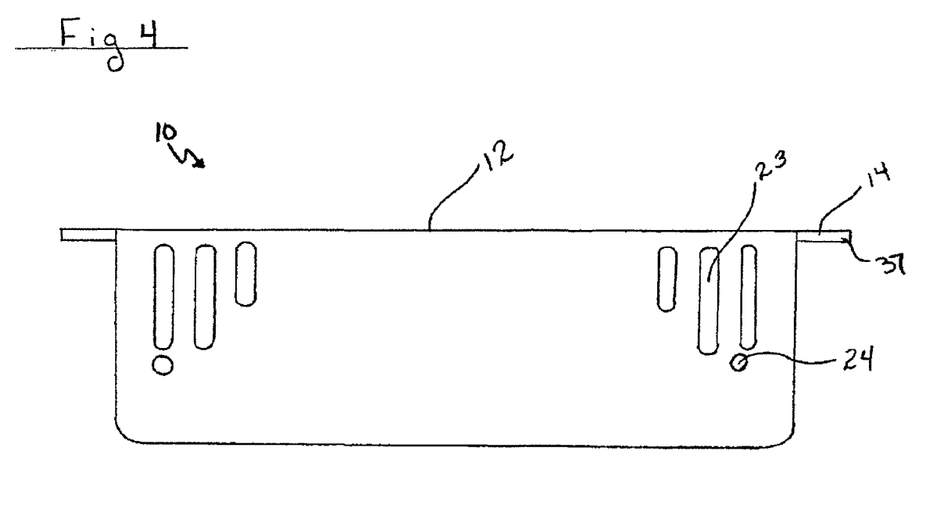
FIG. 4 is a close view of an end cap used with one embodiment of the lamp.

FIG. 4 is a close view of one embodiment of end cap 12 used on in one embodiment of lamp 10. In this view, slots 23 can be appreciated which allow air to flow through the lamp to facilitate cooling. Hole 24 for the holding screw can further be appreciated. Heat sink 14, to which end cap 12 is attached, is also visible.

Figure 5:
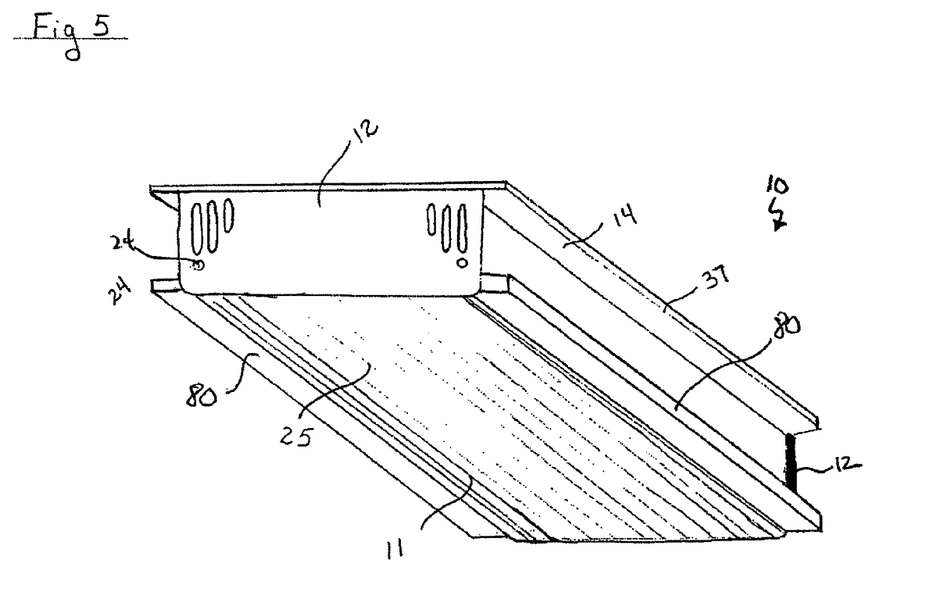
FIG. 5 is a bottom perspective side view of one embodiment of an assembled lamp.

FIG. 5 is a bottom perspective side view of one embodiment of an assembled lamp 10. As can be appreciated, the only region of heat sink 14 visible once lamp 10 is assembled is side region 37 and flanges 80. In this embodiment, lens 11 has optical elements forming ribs 25 that help with the dispersion of light. As stated supra, it should be understood that any optics known in the art able to redirect light such as pillows or rings could also be used instead of or in addition to ribs 25.

Figure 6A:
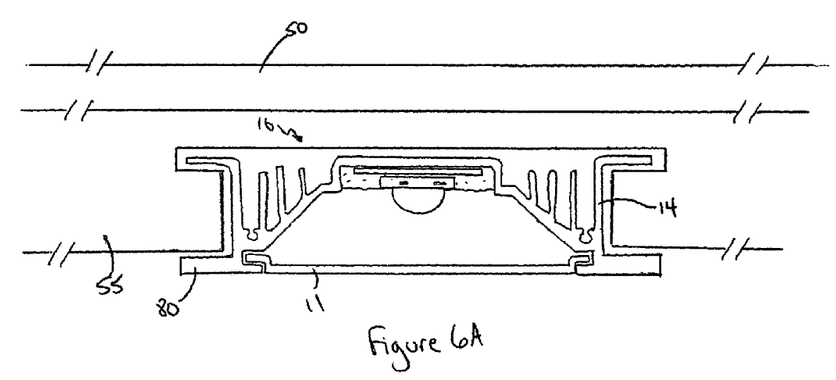
FIGS. 6A and 6B each show a cross-sectional view of an alternate embodiment of the lamp disposed within a vehicle wall.
Figure 6B:
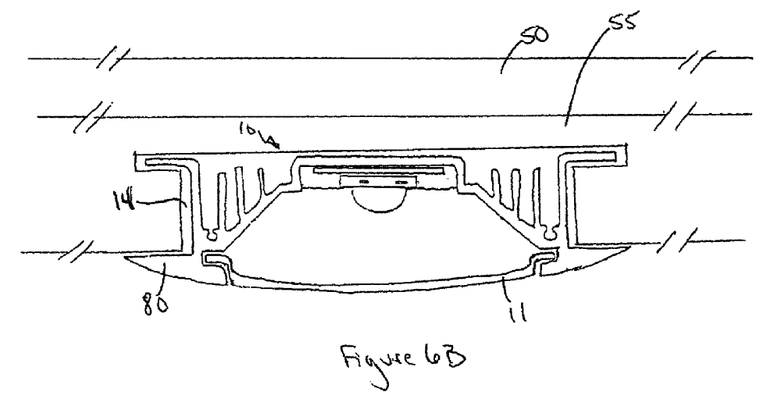

FIGS. 6A and 6B each show a cross-sectional view of alternate embodiments of lamp 10, as situated within vehicle 50. As stated supra, flanges 80 act as a heat exchanger. As can be seen, in a low-temperature environment, for example a refrigerated vehicle 50, there can be insulation 55. Flanges 80 of heat sink 14 act as a heat exchanger with the low-temperature environment and allow the heat generated by lamp 10 to be dissipated. In addition, lamp 10 can be used with any application in which the use of insulation could cause light emitting units 15 to overheat, e.g., a sound recording studio.

FIG. 6A shows an embodiment with a flat lens 11 and flanges 80 flush with lens 11. FIG. 6B shows an embodiment with a generally arcuate lens 11 and with flanges 80 flush with both lens 11 and insulation 55. Although only shown with flanges 80 extending beyond the width of lamp 10, it should be understood that additional flanges can be added to heat sink 14 at edge regions 38 (as can be seen in FIG. 1) such that flanges 80 extend beyond end caps 12, increasing the surface area of flanges in thermal contact with the environment.

Figure 7B:
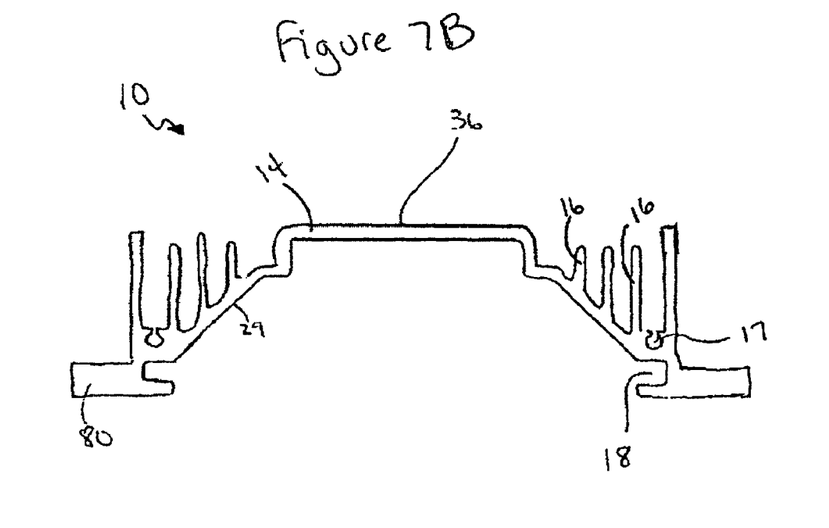

FIGS. 7A and 7B show still further embodiments of housing 14. FIG. 7A shows housing 14 without fins (as discussed supra), and FIG. 7B shows an alternate embodiment of housing 14 without the side regions (also as discussed supra). This embodiment is particularly useful in retro-fitting applications for replacing existing lamp assemblies.

Figure 8A:
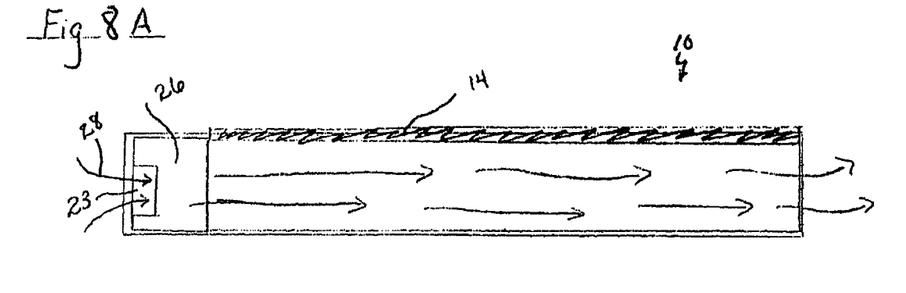
FIGS. 8A, 8B, and 8C are a side view, a top perspective view, and a top view, respectively, of an alternative embodiment for the lamp further including cooling fans.
Figure 8B:
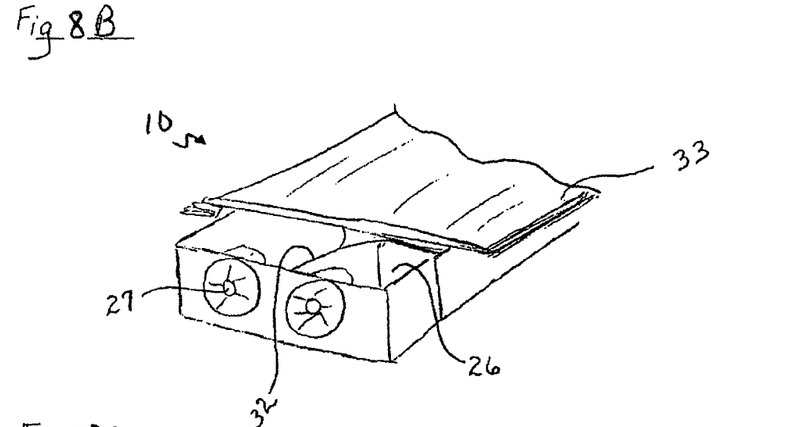
Figure 8C:
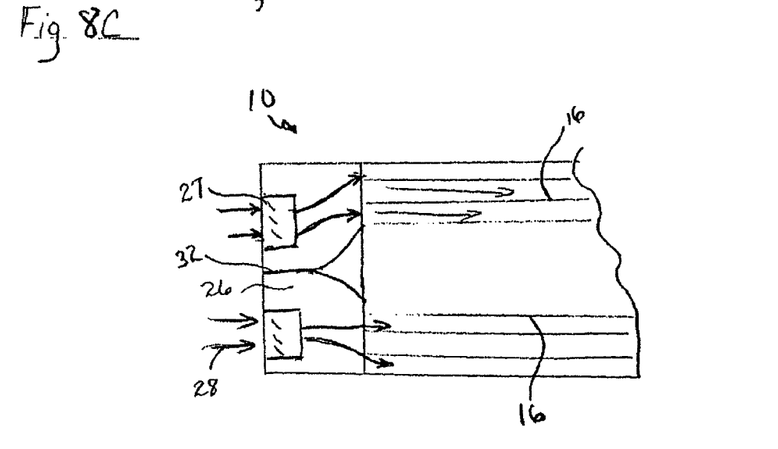

FIGS. 8A, 8B, and 8C are a side view, a top perspective view, and a top view, respectively of an alternative embodiment of lamp 10. FIG. 7A shows an embodiment in which elongated end cap 26 is added to lamp 10 assembly design. Air flows, designated as 28, pass through slots 23 in elongated end cap 26 and through lamp 10. FIG. 8B shows the interior of elongated end cap 26 in which a pair of fans 27 are located. Fans 27 force air from outside of LED lamp 10 for increased cooling. One example of fans 27 that can be used are fans known in the art as "Muffin" fans or "flat-type" fans. Internal baffling 32 directs the air flow across the light emitting units (not shown). In this embodiment, lamp 10 is covered with an additional plate 33 to ensure that the air flows along the length of cooling fins 16 as shown in FIG. 7C.

Figure 9:
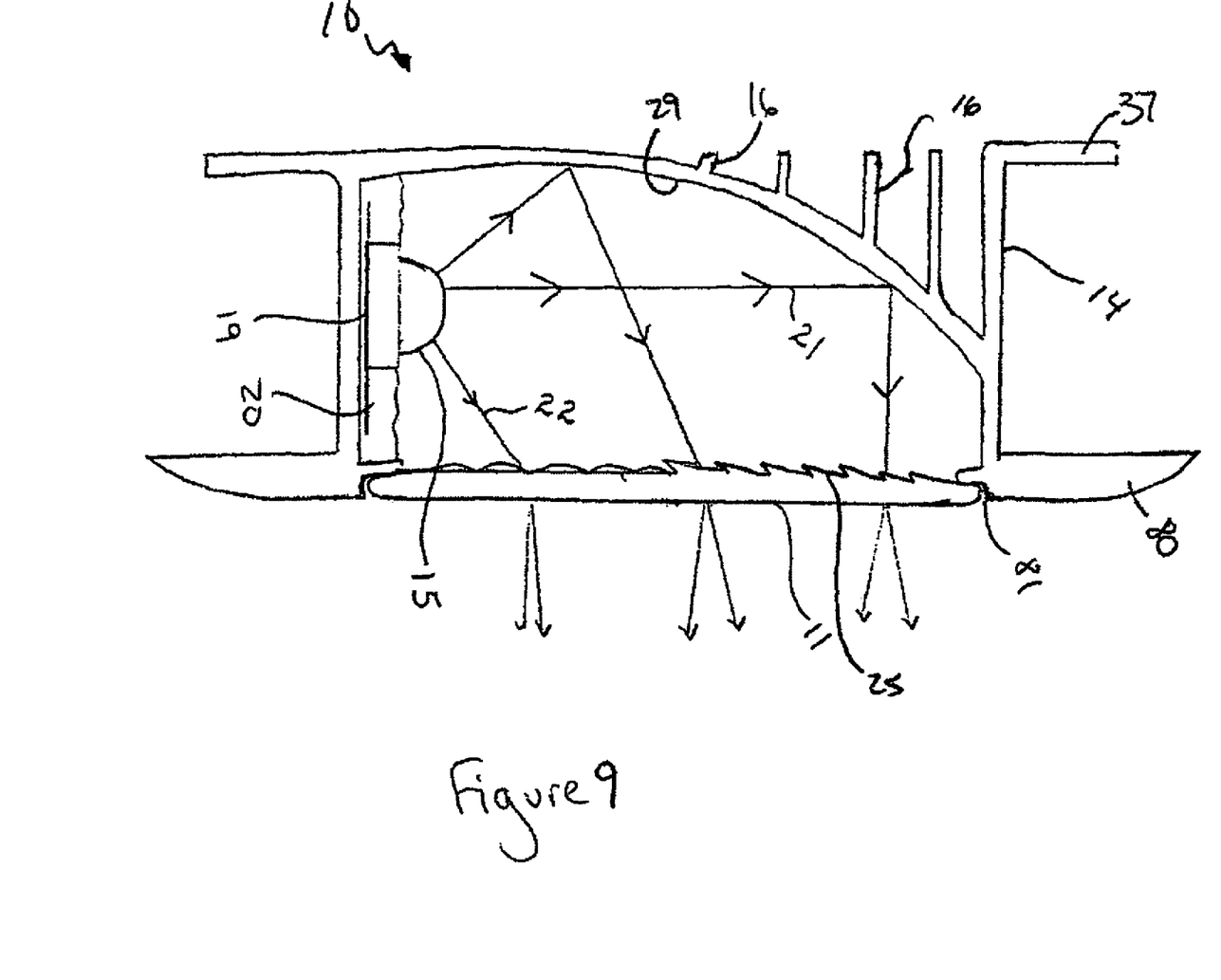
FIG. 9 is a cross-sectional view of one alternative embodiment of the LED lamp.

FIG. 9 is a cross-sectional view of an alternative embodiment of lamp 10 and the relationship among the elements of this embodiment of the invention. In this alternate embodiment of lamp 10, light emitting unit 15 is mounted on a side surface of heat sink 14 and is designed to be mounted on a wall or ceiling next to a wall. As with the earlier described embodiment, light emitting unit 15 emits light which directly passes through lens 11 (as shown by beam 22) as well as across heat sink 14 into the internally curved reflective surface 29 of heat sink 14. Reflective surface 29, as with the embodiment shown in FIG. 3, is designed to reflect the light in the direction of lens 11 (as shown by beam 21). Lens 11 could further include optical surfaces 25 to further control the light ultimately emitted. This embodiment as illustrated is also comprised of cooling fins 16, track 18, potting compound 20, and light emitting unit 15 of the above embodiment. These elements function similarly in this embodiment. As can also be seen in the embodiment of FIG. 8, heat sink 14 does not have any tracks. Rather, lens 11 is secured to housing 80 within recess 81 by any means commonly known in the art.

Figure 10A:
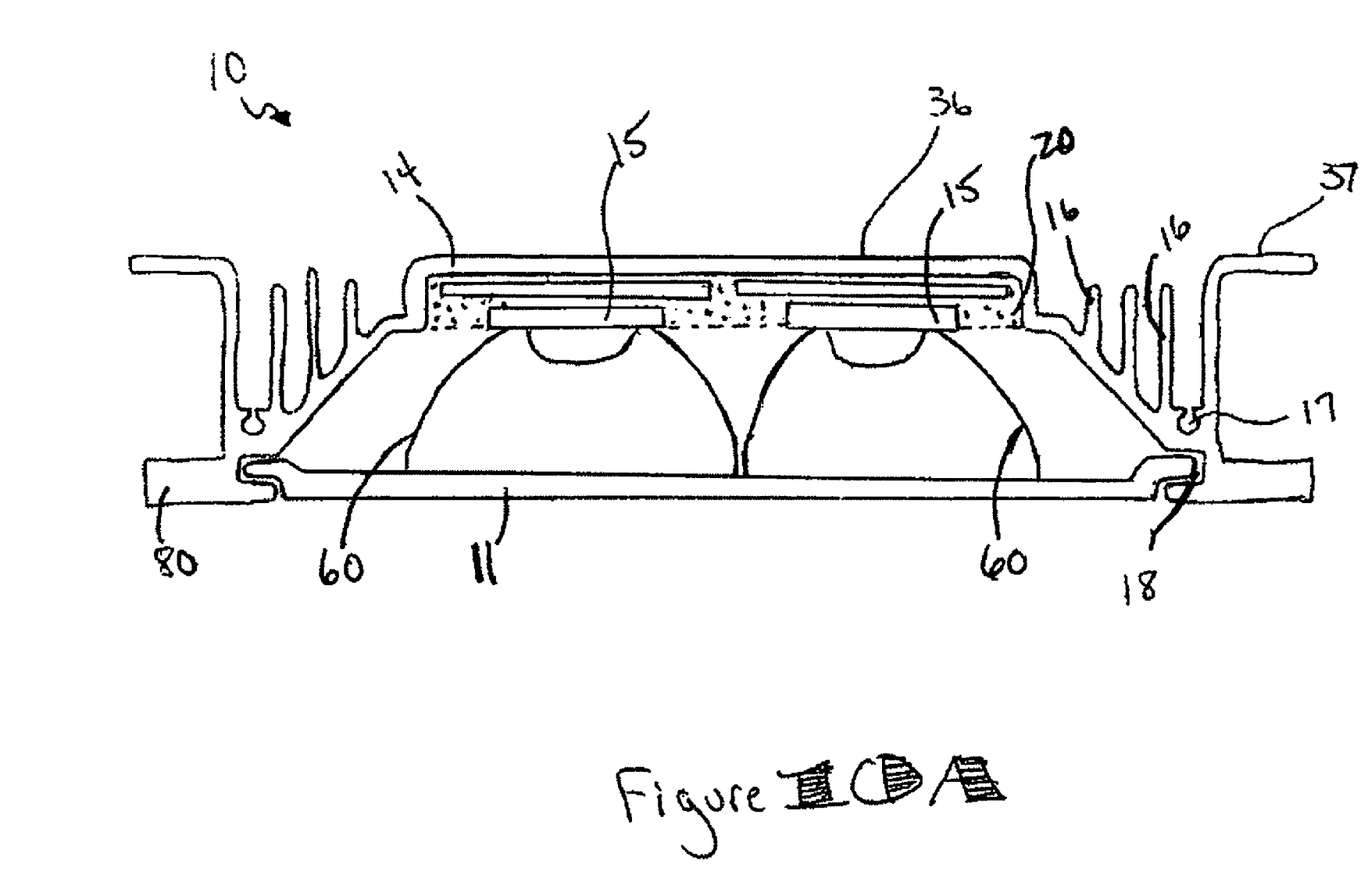
FIGS. 10A, 10B, and 10C show one embodiment of a reflector used in alternate embodiments of the lamp.
Figure 10B:
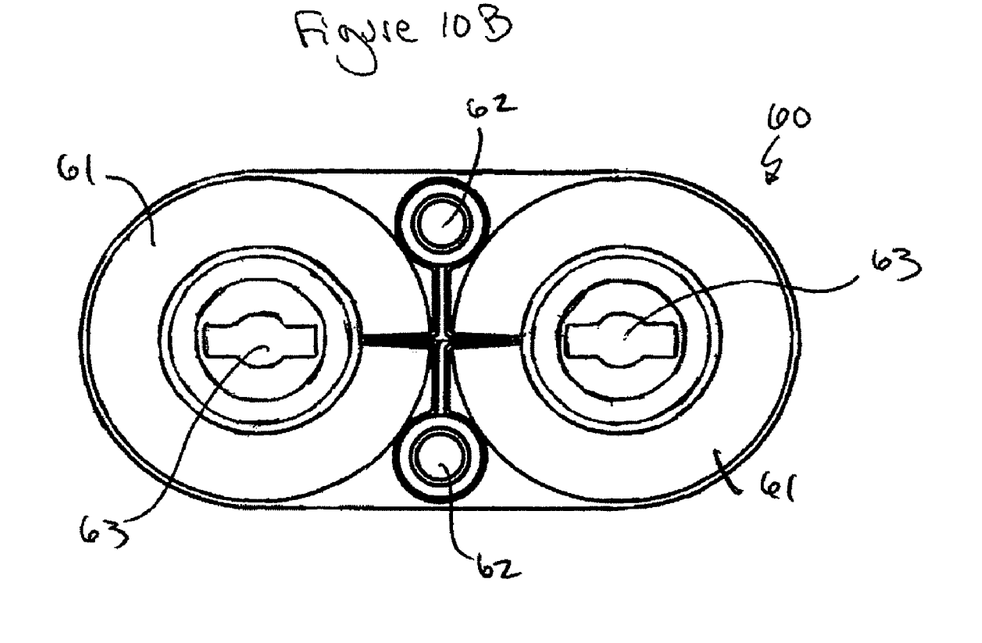
Figure 10C:
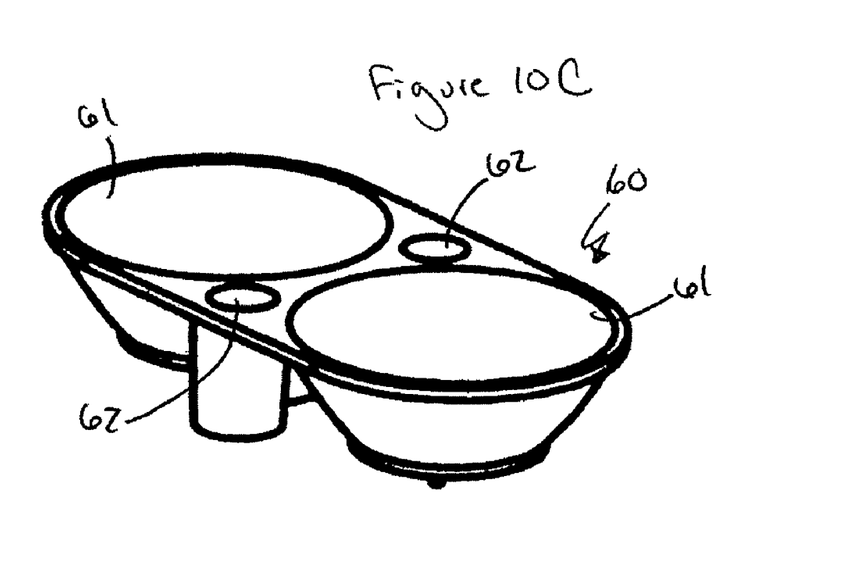

FIG. 10A shows a cross-sectional view of an embodiment of lamp 10 in which parabolic reflectors 60 are used, as discussed supra. In this embodiment, there are two (2) rows of light emitting units 15, each of which has a single reflector 60. However, one of ordinary skill in the art will appreciate that any number of rows of light emitting units 15 could be employed. As stated supra, reflectors 60 are each a 6 mm focus parabolic reflector 60. FIGS. 10B and 10C show a bottom view and a perspective view of reflector 60, respectively. As can be seen, reflector 60 is comprised of reflective inner surfaces 61, throughholes 62, which allow reflector 60 to be secured to the housing (shown in FIG. 10A), and openings 63, each of which allow a corresponding light emitting unit (not shown) to be positioned within reflector 60.

Although, for convenience, the invention has been described primarily with reference to several specific embodiments, it will be apparent to those of ordinary skill in the art that the valve and the components thereof can be modified without departing from the spirit and scope of the invention as claimed.

What is claimed is:

1. A lamp assembly comprised of:
    a heat sink, said heat sink having an inside surface, a back surface, and at least one flange extending from said lamp assembly and into an environment;
    a circuit board disposed on said inside surface of said heat sink, said circuit board having a power supply circuitry;
    at least one light emitting unit, said at least one light emitting unit electrically connected to said circuit board by at least one corresponding electrical connection;
    a potting compound substantially surrounding said circuit board and sealing said at least one corresponding electrical connection; and
    a lens operatively attached to said heat sink, said lens allowing for the transmission of light emitted from said at least one light emitting unit.

2. The lamp assembly of claim 1, wherein said heat sink is made of aluminum.

3. The lamp assembly of claim 1, wherein said heat sink is further comprised of a plurality of fins for dissipating heat.

4. The lamp assembly of claim 1, wherein said heat sink is further comprised of two tracks adapted to receive said lens.

5. The lamp assembly of claim 1, wherein said inside surface of said heat sink is further comprised of a reflective surface.

6. The lamp assembly of claim 1, wherein said lamp assembly is further comprised of least one parabolic reflector.

7. The lamp assembly of claim 1, wherein said heat sink is extruded.

8. The lamp assembly of claim 7, wherein said lamp assembly further includes a first end cap and a second end cap mounted to said heat sink.

9. The lamp assembly of claim 8, wherein said first end cap and said second end cap have portions forming at least one slot for allowing air to pass through said lamp assembly.

10. The lamp assembly of claim 8, wherein said end caps are elongated and adapted to receive at least one fan for increasing air flow through said lamp assembly.

11. The lamp assembly of claim 1, wherein said heat sink further comprises a first end cap and a second end cap, said heat sink, said first end cap, and said second end cap being made of one contiguous die cast piece.

12. The lamp assembly of claim 11, wherein said first end cap and said second end cap have portions forming at least one slot for allowing air to pass through said lamp assembly.

13. The lamp assembly of claim 11, wherein said end caps are elongated and adapted to receive at least one fan for increasing air flow through said lamp assembly.

14. The lamp assembly of claim 1, wherein said power supply circuitry of said circuit board is selected from a group comprised of a linear regulator or a switching power supply for DC to DC conversion.

15. The lamp assembly of claim 1, wherein each of said at least one light emitting unit is a light emitting diode.

16. The lamp assembly of claim 1, wherein said at least one light emitting unit emits white light with a luminous flux within a range of approximately 10 to approximately 1000 lumens.

17. The lamp assembly of claim 1, wherein said lens is made of a material selected from a group comprising acrylic, polycarbonate, and translucent nylon.

18. The lamp assembly of claim 1, wherein said lens is further comprised of an optical element, said optical element selected from a group comprised of at least one rib, at least one pillow, and at least one ring.

19. The lamp assembly of claim 1, wherein said environment is a cold-temperature environment.

20. A device comprised of:
    a heat sink, said heat sink having an inside surface, a back surface, at least one flange extending into an environment and one or more fins for dissipating heat;
    a circuit board disposed on said inside surface of said heat sink, said circuit board having power supply circuitry;
    at least one light emitting unit, said at least one light emitting unit electrically connected to said circuit board by at least one corresponding electrical connection;
    a potting compound substantially surrounding said circuit board and sealing said at least one corresponding electrical connection; and
    a lens operatively attached to said heat sink, said lens allowing for the transmission of light emitted from said at least one light emitting unit.

21. The device of claim 20, wherein said heat sink is made of aluminum.

22. The device of claim 20, wherein said heat sink is further comprised of two tracks adapted to receive said lens.

23. The device of claim 20, wherein said inside surface of said heat sink is further comprised of a reflective surface.

24. The device of claim 23, wherein said reflective surface is at least one parabolic reflector.

25. The device of claim 23, wherein said heat sink is extruded.

26. The device of claim 25, wherein said device further includes a first end cap and a second end cap mounted to said heat sink.

27. The device of claim 26, wherein said first end cap and said second end cap have portions forming at least one slot for allowing air to pass through said lamp assembly.

28. The device of claim 26, wherein said end caps are elongated and adapted to receive at least one fan for increasing air flow through said device.

29. The device of claim 20, wherein said heat sink further comprises a first end cap and a second end cap, said heat sink, said first end cap, and said second end cap being made of one contiguous die cast piece.

30. The device of claim 29, wherein said first end cap and said second end cap have portions forming at least one slot for allowing air to pass through said device.

31. The device of claim 29, wherein said end caps are elongated and adapted to receive at least one fan for increasing air flow through said device.

32. The device of claim 20, wherein said power supply circuitry of said circuit board is selected from a group comprised of a linear regulator or a switching power supply for DC to DC conversion.

33. The device of claim 20, wherein each of said at least one light emitting unit is a light emitting diode.

34. The device of claim 20, wherein said at least one light emitting unit emits white light with a luminous flux within a range of approximately 10 to approximately 1000 lumens.

35. The device of claim 20, wherein said lens is made of a material selected from a group comprising acrylic, polycarbonate, and translucent nylon.

36. The device of claim 20, wherein said lens is further comprised of an optical element, said optical element selected from a group comprised of at least one rib, at least one pillow, and at least one ring.

37. The device of claim 20, wherein said device is for use in a cold-temperature environment.

38. A device for use in a low-temperature environment comprised of:
a heat sink, said heat sink having an inside surface, a back surface, a first end, a second end, and at least one flange extending from said device into said low-temperature environment;
a circuit board disposed on said inside surface of said heat sink, said circuit board having a power supply circuitry;
at least one light emitting unit, said at least one light emitting unit electrically connected to said circuit board by at least one corresponding electrical connection;
a potting compound substantially surrounding said circuit board and sealing said at least one corresponding electrical connection;
a lens operatively attached to said heat sink, said lens allowing for the transmission of visible light emitted from said at least one light emitting unit; and
a first end cap at said first end of said heat sink and a second end cap at said second end of said heat sink, wherein said first end cap and said second end cap each have portions forming a box, said box adapted to receive at least one fan for cooling said device.

39. The device of claim 38, wherein said heat sink is made of aluminum.

40. The device of claim 38, wherein said heat sink is further comprised of a plurality of fins for dissipating heat.

41. The device of claim 38, wherein said heat sink is further comprised of two tracks adapted to receive said lens.

42. The device of claim 38, wherein said inside surface of said heat sink is further comprised of a reflective surface.

43. The device of claim 42, wherein said reflective surface of said heat sink is a least one six millimeter parabolic reflector.

44. The device of claim 38, wherein said heat sink is extruded.

45. The device of claim 38, wherein said first end cap and said second end cap have portions forming slots for allowing air to pass through said device.

46. The device of claim 38, wherein said heat sink, said first end cap, and said second end cap are made of one contiguous die cast piece.

47. The device of claim 38, wherein said power supply circuitry of said circuit board is selected from a group comprised of a linear regulator or a switching power supply for DC to DC conversion.

48. The device of claim 38, wherein each of said at least one light emitting units is a light emitting diode.

49. The device of claim 38, wherein said at least one light emitting unit emits white light with a luminous flux within a range of approximately 10 to approximately 1000 lumens.

50. The device of claim 38, wherein said lens is made of a material selected from a group comprising acrylic, polycarbonate, and translucent nylon.

51. The device of claim 38, wherein said lens is further comprised of an optical element, said optical element selected from a group comprised of at least one rib, at least one pillow, and at least one ring.

52. The device of claim 38, wherein said device is for use in a cold-temperature environment.

53. A lamp assembly comprised of:
a heat sink, said heat sink having an inside surface, a back surface, a first end, a second end, and at least one flange extending from said lamp assembly, at least one fin, and at least one parabolic reflector;
a circuit board disposed on said inside surface of said heat sink, said circuit board having a power supply circuitry;
at least one LED, said at least one LED electrically connected to said circuit board by at least one corresponding electrical connection;
a potting compound substantially surrounding said circuit board and sealing said at least one corresponding electrical connection;
a lens operatively attached to said heat sink, said lens allowing for the transmission of light emitted from said at least one LED;
a first end cap at said first end of said heat sink and a second end cap at said second end of said heat sink, wherein said first end cap and said second end cap each have portions forming a box, said box adapted to receive at least one fan for forcing air through and cooling said lamp assembly.

54. The lamp assembly of claim 53, wherein said heat sink is made of aluminum.

55. The lamp assembly of claim 53, wherein said heat sink is further comprised of two tracks adapted to receive said lens.

56. The lamp assembly of claim 53, wherein said heat sink is extruded.

57. The lamp assembly of claim 53, wherein said first end cap and said second end cap have portions forming slots for allowing air to pass through said lamp assembly.

58. The lamp assembly of claim 53, wherein said heat sink, said first end cap, and said second end cap being made of one contiguous die cast piece.

59. The lamp assembly of claim 53, wherein said power supply circuitry of said circuit board is selected from a group comprised of a linear regulator or a switching power supply for DC to DC conversion.

60. The lamp assembly of claim 53, wherein said at least one LED emits white light with a luminous flux within a range of approximately 10 to approximately 1000 lumens.

61. The lamp assembly of claim 53, wherein said lens is made of a material selected from a group comprising acrylic, polycarbonate, and translucent nylon.

62. The lamp assembly of claim 53, wherein said lens is further comprised of an optical element, said optical element selected from a group comprised of at least one rib, at least one pillow, and at least one ring.

63. The lamp assembly of claim 53, wherein said lamp assembly is for use in a cold-temperature environment.

64. A lamp assembly comprised of:
  a heat sink, said heat sink having an inside surface, a back surface, and at least one flange extending from said lamp assembly, said flange having at least one surface exposed to an environment such that the flange is adapted to dissipate heat generated by said lamp assembly;
  a circuit board disposed on said inside surface of said heat sink;
  at least one light emitting unit, said at least one light emitting unit electrically connected to said circuit board at least one corresponding electrical connection; and
  a lens operatively attached to said heat sink, said lens allowing for the transmission of light emitted from said at least one light emitting unit.

65. The lamp assembly of claim 64, wherein said heat sink is further comprised of a plurality of fins for dissipating heat.

66. The lamp assembly of claim 64, wherein said inside surface of said heat sink is further comprised of a reflective surface.

67. The lamp assembly of claim 64, wherein said lamp assembly is further comprised of least one parabolic reflector.

68. The lamp assembly of claim 64, wherein said heat sink is extruded.

69. The lamp assembly of claim 64, wherein each of said at least one light emitting unit is a light emitting diode.

70. The lamp assembly of claim 64, wherein said environment is a cold-temperature environment.

* * * * *